United States Patent
Honda

(10) Patent No.: US 9,870,073 B2
(45) Date of Patent: Jan. 16, 2018

(54) POSITION DETECTION DEVICE, PROJECTOR, AND POSITION DETECTION METHOD

(71) Applicant: SEIKO EPSON CORPORATION, Tokyo (JP)

(72) Inventor: Yasuhiro Honda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 14/857,261

(22) Filed: Sep. 17, 2015

(65) Prior Publication Data

US 2016/0093035 A1    Mar. 31, 2016

(30) Foreign Application Priority Data

Sep. 26, 2014 (JP) ................. 2014-196496

(51) Int. Cl.
| | |
|---|---|
| G06K 9/00 | (2006.01) |
| G06F 3/0354 | (2013.01) |
| G06K 9/32 | (2006.01) |
| G06F 3/0488 | (2013.01) |
| G06F 3/03 | (2006.01) |
| G06F 3/042 | (2006.01) |
| H04N 9/31 | (2006.01) |

(52) U.S. Cl.
CPC ........ *G06F 3/03545* (2013.01); *G06F 3/0304* (2013.01); *G06F 3/0425* (2013.01); *G06F 3/0488* (2013.01); *G06K 9/00369* (2013.01); *G06K 9/3241* (2013.01); *H04N 9/3179* (2013.01); *H04N 9/3194* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2009/0095540 A1 | 4/2009 | Zachut et al. | |
| 2011/0169756 A1 | 7/2011 | Ogawa et al. | |
| 2013/0076617 A1* | 3/2013 | Csaszar | G06F 3/017 345/156 |

(Continued)

FOREIGN PATENT DOCUMENTS

| | | |
|---|---|---|
| JP | H05-143226 A | 6/1993 |
| JP | H09-138730 A | 5/1997 |

(Continued)

*Primary Examiner* — Weiwen Yang
(74) *Attorney, Agent, or Firm* — Oliff PLC

(57) ABSTRACT

A position detection device capable of preventing an operation that is not intended by an operator from being detected as an input is provided. The position detection device includes: a detecting section that detects an indicator that performs an operation with respect to a screen, and an indicator different from the indicator; an imaging section that forms a captured image obtained by imaging a range including the screen; and a control section that detects a motion of the indicator with respect to the screen and a position of the indicator with respect to the screen based on data on the captured image of the imaging section to determine whether or not to detect an operation based on the indicator as an input.

9 Claims, 6 Drawing Sheets

(56) References Cited

U.S. PATENT DOCUMENTS

| | | | |
|---|---|---|---|
| 2013/0207998 A1* | 8/2013 | Aoki | G06F 3/00 345/619 |
| 2014/0125629 A1 | 5/2014 | Miyamoto et al. | |
| 2014/0132561 A1 | 5/2014 | Miyamoto et al. | |
| 2014/0139482 A1 | 5/2014 | Miyamoto et al. | |
| 2015/0123899 A1* | 5/2015 | Taylor | G06F 3/0425 345/157 |

FOREIGN PATENT DOCUMENTS

| JP | H10-124239 A | 5/1998 |
|---|---|---|
| JP | 2000-172441 A | 6/2000 |
| JP | 3758866 B2 | 3/2006 |
| JP | 2011-143557 A | 7/2011 |
| JP | 2013-008317 A | 1/2013 |
| JP | 5350437 B2 | 11/2013 |
| JP | 5372000 B2 | 12/2013 |
| JP | 2014-102628 A | 6/2014 |

* cited by examiner ures disclosed in JP-A-10-124239, JP-A-
POSITION DETECTION DEVICE, PROJECTOR, AND POSITION DETECTION METHOD The entire disclosure of Japanese Patent Application No. 2014-196496, filed Sep. 26, 2014 is expressly incorporated by reference herein.

BACKGROUND

1. Technical Field

The present invention relates to a position detection device, a projector, and a position detection method.

2. Related Art

In the related art, in a tablet device, a technique that detects an operation of a pen, and an operation using a finger or the like is known (for example, see JP-A-10-124239, JP-A-9-138730, and JP-A-5-143226). Such a device includes a configuration that prevents an unintended operation using a finger or the like from being detected. For example, a configuration disclosed in JP-A-10-124239 deletes, when input information using a pen is continuously present after input information using a finger or the like, the input information using the finger or the like. A configuration disclosed in JP-A-9-138730 negates touch input when it is detected that an exclusive pen approaches an electromagnetic inductive tablet. A configuration disclosed in JP-A-5-143226 performs a setting so that the sensitivity of apart of a pressure-sensitive tablet is reduced.

The configurations disclosed in JP-A-10-124239, JP-A-9-138730, and JP-A-5-143226 relate to a tablet that detects an operation based on a change in the intensity of electric current due to contact of a pen or a finger, and relate to a tablet that employs a pressure sensitive technique or an electromagnetic inductive technique, but other configurations capable of performing a position input operation using a pen or a finger have been used. However, as various position input operations are possible, an operation that is not intended by an operator may be detected as an input operation.

SUMMARY

An advantage of some aspects of the invention is to provide a position detection device, a projector, and a position detection method capable of preventing an operation that is not intended by an operator from being detected as an input.

An aspect of the invention is directed to a position detection device including: a detecting section that detects an indicator and a target different from the indicator, the indicator performing a first operation with respect to an operation surface, the target performing a second operation with respect to the operation surface; an imaging section that forms a captured image obtained by imaging a range including the operation surface; and a control section that detects a motion of the target with respect to the operation surface and a position of the indicator with respect to the operation surface based on the captured image to determine whether or not to detect the first operation performed by the indicator as an input.

According to this configuration, it is possible to prevent an operation that is not intended by an operator from being detected as an input by determining an operation to be detected as an input.

In the position detection device according to the aspect of the invention, the detecting section may detect the position of the indicator or the motion of the indicator, and the control section may detect an input based on the position of the indicator or the motion of the indicator detected by the detecting section.

According to this configuration, it is possible to detect the position or motion of the indicator as an operation.

In the position detection device according to the aspect of the invention, the control section may determine whether or not to detect the position of the indicator or the motion of the indicator as the input based on a distance between the indicator and the operation surface and a distance between the target and the operation surface.

According to this configuration, it is possible to appropriately determine whether or not to detect the position or motion of the indicator as an input based on the distances between the indicator and the target, and the operation surface. Further, an operator can appropriately switch whether to detect the position or motion of the indicator or the position or motion of the target based on the distances between the indicator and the target, and the operation surface.

In the position detection device according to the aspect of the invention, the control section may determine that the position or motion of the indicator is not to be detected as the input when the distance between the indicator and the operation surface is longer than the distance between the target and the operation surface.

According to this configuration, when the distance between the indicator and the operation surface is longer than the distance between the target and the operation surface, it is possible to prevent the position or motion of the indicator from being detected as an input.

In the position detection device according to the aspect of the invention, when the detecting section detects the plural targets, the control section may detect a position or motion of a target for which a distance between the target and the operation surface is shorter than the distance between the indicator and the operation surface as the input.

According to this configuration, it is possible to detect positions or motions of the plural targets for which distances between the targets and the operation surface are shorter than the distance between the indicator and the operation surface as operations. Accordingly, it is possible to perform operations based on the plural targets.

In the position detection device according to the aspect of the invention, when plural targets for which distances between the targets and the operation surface are shorter than the distance between the indicator and the operation surface are detected, the control section calculates a distance change between the plural targets based on the captured image from the imaging section, and detects the motion of the target with respect to the operation surface as the input based on the calculated distance change.

According to this configuration, it is possible to detect the distance change between the plural targets as an input based on the motion of the target with respect to the operation surface.

In the position detection device according to the aspect of the invention, the control section may calculate a temporal change of a relative position of each target with respect to the operation surface based on the captured image from the imaging section to detect the distance change between the plural targets.

According to this configuration, it is possible to calculate the temporal change of the relative position of each target with respect to the operation surface to detect the distance change between the plural targets.

In the position detection device according to the aspect of the invention, when the target detected by the detecting section is an operator's finger that holds the indicator, the control section may detect a position of the target or the motion of the target as the input.

According to this configuration, it is possible to perform the operation by the operator's finger that holds the indicator.

In the position detection device according to the aspect of the invention, when the detecting section detects the plural targets, the control section may associate each of the detected plural targets with the operator to detect an operation for each operator.

According to this configuration, it is possible to detect the operation using the target for each operator.

Another aspect of the invention is directed to a projector including: a projecting section that projects an image onto a projection surface; a detecting section that detects an indicator and a target different from the indicator, the indicator performing a first operation with respect to an operation surface, the target performing a second operation with respect to the operation surface; an imaging section that forms a captured image obtained by imaging a range including the projection surface; and a control section that detects a motion of the target with respect to the projection surface and a position of the indicator with respect to the projection surface based on the captured image to determine whether or not to detect the first operation performed by the indicator as an input.

According to this configuration, by determining an operation to be detected as an input, it is possible to prevent an operation that is not intended by an operator from being detected as an input.

Still another aspect of the invention is directed to a position detection method including: detecting an indicator and a target different from the indicator, the indicator performing a first operation with respect to an operation surface, the target performing a second operation with respect to the operation surface; forming a captured image obtained by imaging a range including the operation surface; and detecting a motion of the target with respect to the operation surface and a position of the indicator with respect to the operation surface based on the image captured in the forming of the captured image to determine whether or not to detect the first operation performed by the indicator as an input.

According to this configuration, by determining an operation to be detected as an input, it is possible to prevent an operation that is not intended by an operator from being detected as an input.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
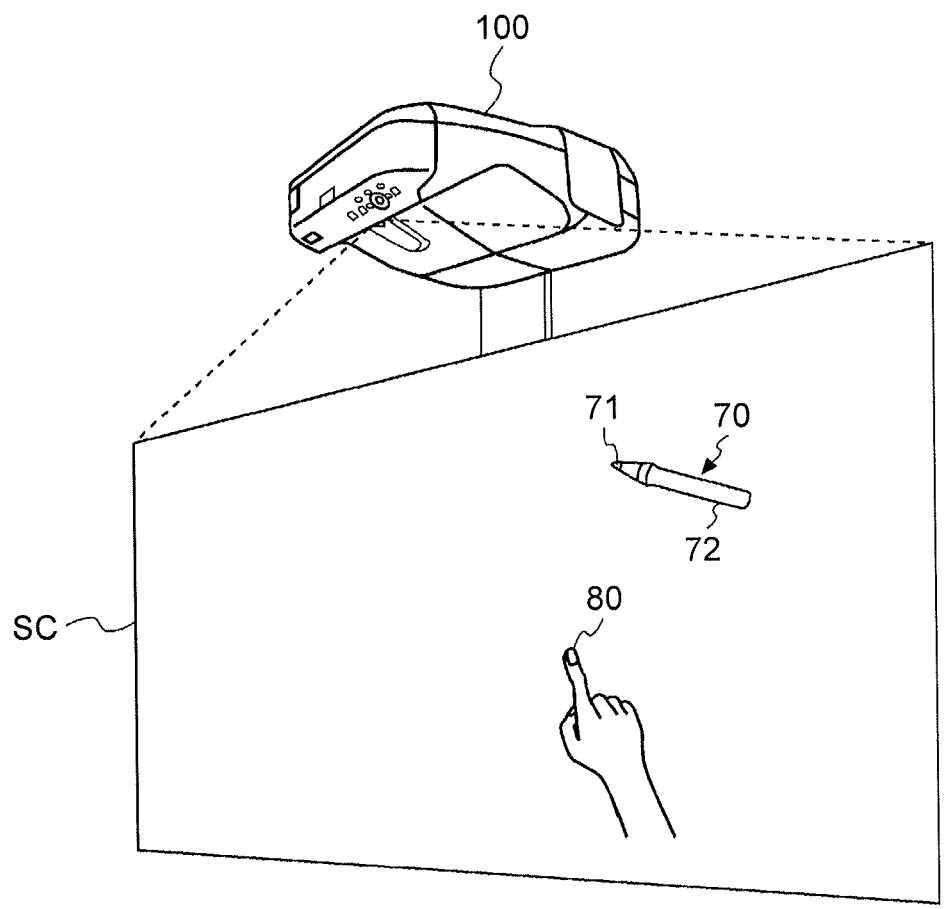
FIG. 1 is a diagram illustrating an installation state of a projector.

FIG. 1 is a diagram illustrating an installation state of a projector (position detection device) 100.

The projector 100 is provided directly on or obliquely above a screen SC (operation surface), and projects an image toward the screen SC provided obliquely under the projector 100. The screen SC is a flat plate or a curtain that is fixed on a wall surface or stands on a floor surface. The invention is not limited to this example, and may have a configuration in which a wall surface is used as the screen SC. In this case, the projector 100 may be mounted on an upper portion of the wall surface used as the screen SC.

The projector 100 is connected to an image supply device such as a personal computer (PC), a video player, a DVD player or a Blu-ray (registered trademark) disc player. The projector 100 projects an image onto the screen SC based on an analog image signal or digital image data supplied from the image supply device. Further, the projector 100 may read image data stored in a built-in storage section 60 (FIG. 2) or a recording medium that is externally connected, and may display an image on the screen SC based on the image data.

The projector 100 detects an indication operation of a user (operator) with respect to the screen SC. In the indication operation with respect to the screen SC, a pen type indicator 70 or an indicator 80 (target) which is a finger of the user is used. Further, the user's indication operation includes an operation of designating (indicating) a position on the screen SC by the indicator 70 or the indicator 80, an operation of continuously indicating a position on the screen SC, or the like. The operation of continuously indicating the position on the screen SC refers to an operation of moving the indicator 70 or 80 with respect to the screen SC to draw a character, a figure or the like. The projector 100 may repeat a detection process of detecting the designated position of the screen SC to detect a locus (motion) of indication positions in the operation of continuously indicating the position on the screen SC by the user.

An operation switch 75 (FIG. 2) that is operated when pressed is provided in a tip portion 71 of the indicator 70. If an operation of pressing the tip portion 71 of the indicator 70 against a wall or the screen SC is performed, the operation switch 75 is turned on. The indicator 70 is operated so that the user holds a rod-shaped shaft section 72 by the hand to bring the tip portion 71 into contact with the screen SC. Further, the indicator 70 is also operated so that the user presses the tip portion 71 against the screen SC. The indicator 70 is provided with a transmitting/receiving section 74 (FIG. 2) that emits infrared light in the tip portion 71. The transmitting/receiving section 74 changes a lighting pattern of the infrared light between when the operation switch 75 is turned on and when the operation switch 75 is turned off.

The projector 100 detects the position of the tip portion 71 as an indication position based on the infrared light emitted from the indicator 70. Further, the projector 100 determines whether the indicator 70 is pressed against a wall or the screen SC based on the lighting pattern of the infrared light emitted by the indictor 70.

Further, the projector 100 detects an indication position of the user's finger which is the indicator 80. The projector 100 may detect any one of the position of the user's finger and a contact position where the finger comes into contact with the screen SC as the indication position based on the indicator 80, and may set which one of the two positions is to be used as the indication position. In addition, the projector 100 calculates a distance between the indicator 80 and the screen SC. When an indication operation is performed using plural fingers of the user, the projector 100 may detect all indication positions based on the plural fingers. Furthermore, the projector 100 may also calculate distances between the plural fingers and the screen SC, respectively.

The projector 100 detects an indication operation performed using the indicator 70 or 80 by a user to reflect the detected indication operation into an image displayed on the screen SC. Specifically, the projector 100 performs a process of drawing a figure or arranging characters or signs at an indication position, a process of drawing a figure along a locus of indication positions, a process of deleting a drawn figure, arranged characters or signs, or the like. Further, the projector 100 may store a drawn figure, arranged characters or signs on the screen SC as image data, and may output the image data to an external device.

Further, the projector 100 may be operated as a pointing device by detecting an indication position, and may output coordinates of the indication position on the screen SC. In addition, a graphical user interface (GUI) operation may be performed with respect to the projector 100 using the coordinates.

Figure 2:
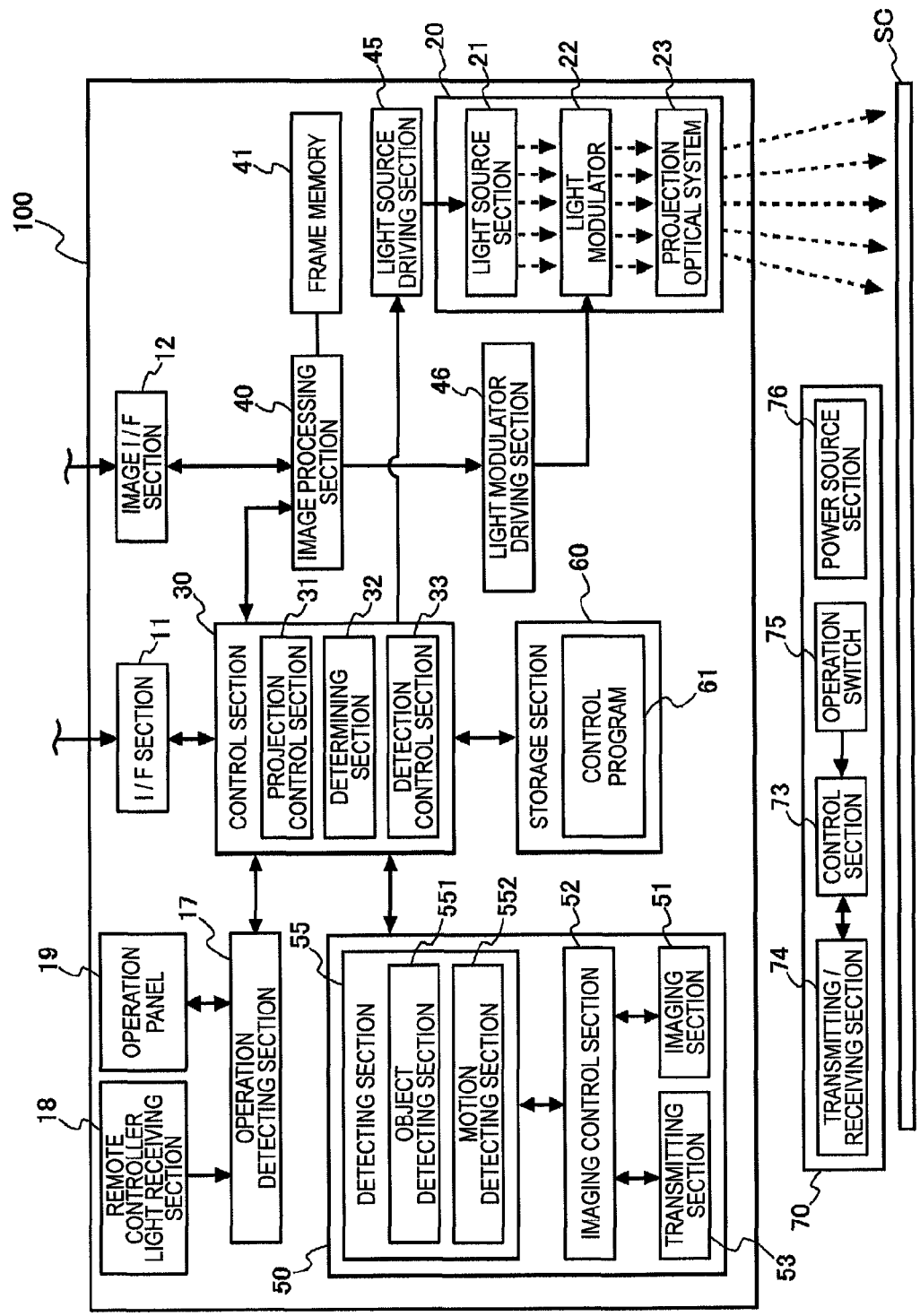
FIG. 2 is a functional block diagram of a projector and an indicator.

FIG. 2 is a configuration diagram illustrating a configuration of the projector 100.

The projector 100 includes an interface (I/F) section 11 and an image interface (I/F) section 12 which are interfaces connected to an external device. Each of the I/F section 11 and the image I/F section 12 may include a connector for wired connection, and may include an interface circuit corresponding to the connector. Further, the I/F section 11 and the image I/F section 12 may include a wireless communication interface. As the connector for wired connection and the interface circuit, a connector and an interface circuit based on a wired LAN, IEEE1394, a USB or the like may be used. In addition, as the wireless communication interface, an interface based on a wireless LAN, Bluetooth (registered trademark) or the like may be used. As the image I/F section 12, an interface for image data such as an HDMI (registered trademark) interface may be used. The image I/F section 12 may include an interface through which audio data is input.

The I/F section 11 indicates an interface through which a variety of data is communicated with an external device such as a PC. The I/F section 11 performs input or output of data relating to projection of an image, data for setting the operation of the projector 100, or the like. A control section (which will be described later) has a function of communicating data with the external device through the I/F section 11.

The image I/F section 12 indicates an interface through which digital image data is input. The projector 100 of the embodiment projects an image based on the digital image data input through the image I/F section 12. The projector 100 may have a function of projecting an image based on an analog image signal, and in this case, the image I/F section 12 may include an analog image interface and an A/D conversion circuit that converts the analog image signal into digital image data.

The projector 100 includes a projecting section 20 that forms an optical image. The projecting section 20 includes a light source section 21, a light modulator 22 and a projection optical system 23. The light source section 21 includes a light source that includes a xenon lamp, an extra-high pressure mercury lamp, a light emitting diode (LED), a laser light source, or the like. Further, the light source section 21 may include a reflector and an auxiliary reflector that guide light emitted by the light source to the light modulator 22. Further, the projector 100 may include a lens group (not shown) for enhancing optical characteristics of projection light, a polarizing plate, a dimmer that reduces the intensity of light emitted by the light source on a path that reaches the light modulator 22, or the like.

The light modulator 22 includes three transmissive liquid crystal panels corresponding to three primary colors of R, G, and B, for example, and modulates light that passes through the liquid crystal panel to generate image light. Light from the light source section 21 is separated into colored lights of three colors of R, G, and B, and the respective colored lights are incident onto corresponding liquid crystal panels. The colored lights that pass through the respective liquid crystal panels and are modulated are synthesized by a synthesis optical system such as a cross dichroic prism to then be emitted to the projection optical system 23.

The projection optical system 23 includes a lens group that guides the image light modulated by the light modulator 22 toward the screen SC to form an image on the screen SC. Further, the projection optical system 23 may include a zoom mechanism that performs enlargement and reduction of an image displayed on the screen SC, and a focus adjustment mechanism that performs focus adjustment. When the projector 100 is a short focus type, a concave mirror that reflects the image light toward the screen SC may be provided in the projection optical system 23.

The projecting section 20 is connected to a light source driving section 45 that turns on the light source section 21 under the control of the control section 30, and a light modulator driving section 46 that operates the light modulator 22 under the control of the control section 30. The light source driving section 45 may have a function of performing switching of turning on and turning off of the light source section 21 to adjust the intensity of light of the light source section 21.

The projector 100 includes an image processing system that processes an image projected by the projecting section 20. The image processing system includes the control section 30 that controls the projector 100, a storage section 60, an operation detecting section 17, an image processing section 40, the light source driving section 45, and the light modulator driving section 46. Further, a frame memory 41 is connected to the image processing section 40, and a position detecting section 50 is connected to the control section 30. These sections may be included in the image processing system.

The control section 30 controls the respective sections of the projector 100 by executing a predetermined control program 61. The storage section 60 stores the control program 61 executed by the control section 30, and data processed by the control section 30 in a non-volatile manner. The storage section 60 stores coordinates of an indication position based on at least one of the indicator 70 and the indicator 80, locus data indicating a locus of indication positions, touch information and distance information in association with user's position information. Details about the information will be described later.

The image processing section 40 processes image data input through the image I/F section 12 under the control of the control section 30, and outputs an image signal to the light modulator driving section 46. Processes executed by the image processing section 40 include a discrimination process of a three-dimensional (stereoscopic) image and a two-dimensional (plane) image, a resolution conversion process, a frame rate conversion process, a distortion correction process, a digital zoom process, a color tone correction process, a luminance correction process, and the like. The image processing section 40 executes a process designated by the control section 30, and performs a process using a parameter input from the control section 30 as necessary. Further, the image processing section 40 may execute a combination of plural processes among the above-described processes.

The image processing section 40 is connected to the frame memory 41. The image processing section 40 develops image data input through the image I/F section 12 into the frame memory 41 to execute the various processes with respect to the developed image data. The image processing section 40 reads the processed image data from the frame memory 41 to generate R, G, and B image signals corresponding to the image data, and then, outputs the result to the light modulator driving section 46.

The light modulator driving section 46 is connected to a liquid crystal panel of the light modulator 22. The light modulator driving section 46 drives the liquid crystal panel based on the image signal input from the image processing section 40, and draws an image on each liquid crystal panel.

The operation detecting section 17 is connected to a remote controller light receiving section 18 and an operation panel 19 that function as an input device, and detects an operation through the remote controller light receiving section 18 and the operation panel 19.

The remote controller light receiving section 18 receives a transmitted infrared signal corresponding to a button operation of a remote controller (not shown) used by the user of the projector 100. The remote controller light receiving section 18 decodes the infrared signal received from the remote controller to generate operation data indicating operation content in the remote controller, and outputs the result to the control section 30.

The operation panel 19 is provided in an exterior housing of the projector 100, and includes various switches and indicator lamps. The operation detecting section 17 appropriately turns on or turns off the indicator lamps of the operation panel 19 according to an operation state or a setting state of the projector 100 under the control of the control section 30. If the switch of the operation panel 19 is operated, operation data corresponding to the operated switch is output from the operation detecting section 17 to the control section 30.

The position detecting section 50 detects indication positions of the indicators 70 and 80 with respect to the screen SC or motions of the indicators 70 and 80 with respect to the screen SC. The position detecting section 50 includes respective sections of an imaging section 51, an imaging control section 52, a transmitting section 53, and a detecting section 55. Further, the detecting section 55 includes an object detecting section 551 and a motion detecting section 552.

The imaging section 51 forms a captured image obtained by imaging a range including the screen SC and a peripheral portion thereof (range including the operation surface) as an imaging range so as to detect the indication positions of the indicators 70 and 80.

The imaging section 51 may execute imaging based on infrared light and imaging based on visible light, respectively. Specifically, the imaging section 51 may be provided with an infrared imaging element that images infrared light, a visible light imaging element that images visible light, an interface circuit of the infrared imaging element, and an interface circuit of the visible imaging element. Further, the imaging section 51 may perform imaging of visible light and infrared light using one imaging element. In addition, for example, the imaging section 51 may be provided with a filter that blocks a part of the light incident onto an imaging element, and when infrared light is received by the imaging element, the filter that transmits light in an infrared region may be disposed in front of the imaging element. The imaging element is not particularly limitative, and may use any one of a CCD and a CMOS, or may use other elements.

An imaging direction of the imaging section 51 in imaging based on infrared light is the same direction or approximately the same direction as that of the projection optical system 23, and an imaging range (view angle) thereof covers a range where the projection optical system 23 projects an image onto the screen SC. Similarly, an imaging direction of the imaging section 51 in imaging based on visible light is the same direction or approximately the same direction as that of the projection optical system 23, and an imaging range thereof covers a range where the projection optical system 23 projects an image onto the screen SC. The imaging section 51 outputs data on an image captured based on the infrared light and data on an image captured based on the visible light, respectively.

The imaging control section 52 controls the imaging section 51 under the control of the control section 30 to cause the imaging section 51 to perform imaging. The imaging control section 52 obtains data on an image captured by the imaging section 51 and outputs the result to the detecting section 55. Further, the imaging control section 52 outputs the acquired captured image data to the control section 30. The control section 30 stores the captured image data input from the imaging control section 52 in the storage section 60.

The screen SC, the projection image projected onto the screen SC, and the user who is present within the imaging range are included in the image captured by the imaging section 51 based on the visible light. Further, an image of infrared light emitted from the indicator 70 is included in the image captured by the imaging section 51 based on the infrared light.

The transmitting section 53 transmits an infrared signal to the indicator 70 under the control of the imaging control section 52. The transmitting section 53 includes a light source such as an infrared LED, and turns on or turns off the light source under the control of the imaging control section 52.

The object detecting section 551 detects a person region in which a person is captured from the captured image data of the imaging control section 52. The person region indicates a region where an image of the person is included in the captured image. The detection of the person region by means of the object detecting section 551 may be performed using a generally known method. For example, the object detecting section 551 detects an edge of the input captured image data to detect a region that matches a person's shape as the person region. Further, the object detecting section 551 may detect a region where color information (luminance, color tone or the like) is changed within a predetermined period of time, and may detect a region where the size of the detected region is equal to or greater than a predetermined value or a temporal movement range of the detected region is within a predetermined range as the person region.

If the person region is detected, the object detecting section 551 specifies the position of the user based on the detected person region. For example, the object detecting section 551 calculates center coordinates of the person region in a horizontal direction of the captured image data as position information indicating the position of the user. When the person region is detected from the captured image data plural times, the object detecting section 551 also detects the position information indicating the position of the user plural times according to the person region.

Further, the object detecting section 551 recognizes a body portion of the user (for example, head, shoulder, hand, foot or the like) based on the detected person region to detect a posture of the user. The posture of the user indicates a body posture such as a standing posture, a sitting posture, a bending down state, or an arms-folded state, and may include a direction of the body such as a direction facing toward the screen SC or a direction facing away from the screen, for example. The object detecting section 551 determines whether the user is in a posture capable of performing an indication operation with respect to the screen SC based on the detected user's posture. When it is determined that the user's posture is the arms-folded posture, for example, the object detecting section 551 determines that the user is not in the posture capable of performing the operation with respect to the screen SC. When it is determined that the user is not in the posture capable of performing the operation with respect to the screen SC, the object detecting section 551 may stop a process such as detection of the indicator 80 with respect to the person region where the user is detected.

Further, the object detecting section 551 detects an image of a user's finger from the person region of the captured image data to detect the indicator 80. The user's finger may be only one or plural fingers, may be the entirety of the hand, or may be a part of the hand including the fingers. The object detecting section 551 detects a region close to a predetermined finger's shape or characteristic from the person region as the region of the indicator 80.

Further, the object detecting section 551 calculates coordinates of an indication position of the screen SC designated by the detected indicator 80. The object detecting section 551 specifies a tip (finger tip) of the finger from the region of the detected indicator 80, and detects the position of the tip of the specified finger as the indication position. The object detecting section 551 calculates coordinates of the indication position of the indicator 80 in the coordinates in the captured image data. Further, the object detecting section 551 calculates coordinates on a coordinate axis that is virtually provided on an image displayed on the screen SC from the coordinates of the detected indication position. The coordinates in the captured image data are affected by various elements such as a distance between the projector 100 and the screen SC, a zoom rate in the projection optical system 23, an installation angle of the projector 100, or a distance between the imaging section 51 and the screen SC. The object detecting section 551 calculates coordinates of the indication position in the image displayed on the screen SC from the coordinates of the indication position in the captured image data based on a result of calibration which is executed in advance. In the calibration, a predetermined pattern image is projected onto the screen SC from the projecting section 20, and the displayed pattern image is captured by the imaging section 51. A correspondence relation (coordinate conversion parameters) between the coordinates in the captured image data and the coordinates on the image displayed on the screen SC is derived based on the pattern image captured by the imaging section 51.

Further, the object detecting section 551 detects a distance between the detected indicator 80 and the screen SC. The object detecting section 551 determines a distance between the tip of the detected finger and the screen SC based on the captured image data. For example, the object detecting section 551 detects an image of the finger from the captured image data and a shadow image of the finger, and calculates the distance between the tip of the finger and the screen SC based on a distance between the detected images.

Further, when plural person regions are detected from the captured image data, the object detecting section 551 detects the indicator 80 and coordinates of an indication position of the indicator 80 with respect to each person region, and calculates a distance between the detected indicator 80 and the screen SC.

The object detecting section 551 outputs the coordinates of the indication position of the indicator 80, and distance information indicating the distance between the indicator 80 and the screen SC together with the user's position information to the control section 30. The control section 30 stores the coordinates of the indication position and the distance information in association with the user's position information in the storage section 60.

Further, the object detecting section 551 detects coordinates of an indication position of the indicator 70. The object detecting section 551 detects an infrared light image included in data on an image captured by the imaging section 51 based on infrared light to detect the coordinates of the indication position of the indicator 70. A method of specifying the indicator 70 from the captured image data of the imaging section 51 will be described in detail.

If the coordinates of the indication position of the indicator 70 are detected, the object detecting section 551 calculates coordinates of an indication position in an image displayed on the screen SC from the coordinates of the indication position in the captured image data based on a calibration result. Further, the object detecting section 551 determines whether the tip of the indicator 70 is in contact with the screen SC. A method of determining whether the tip of the indicator 70 is in contact with the screen SC will be described later.

Further, the object detecting section 551 specifies a user corresponding to the indicator 70 based on the coordinates of the indication position of the detected indicator 70. That is, the object detecting section 551 specifies a user who holds the indicator 70 with the hand for operation. In some cases, plural person regions may be detected from the captured image data, or plural users may use the indicator 70. Thus, the object detecting section 551 associates the indicator 70 with the position information about the user based on the detected person region and the coordinates of the indication position of the indicator 70 (coordinates in the captured image data). The object detecting section 551 associates the indicator 70 with the user's position information according to which person region the coordinates of the indication position of the indicator 70 are included in or are closest to.

If the indicator 70 is associated with the user's position information, the object detecting section 551 outputs the coordinates of the indication position of the indicator 70 and touch information together with the position information about the associated user to the control section 30. The touch information refers to information indicating whether the indicator 70 is in contact with the screen SC.

The motion detecting section 552 detects motions of the indicators 70 and 80 indicated by the control section 30. The motion detecting section 552 includes a memory (not shown), and temporarily stores coordinates of the indication positions of the indicators 70 and 80, which are detected by the object detecting section 551, in the memory to calculate a temporal change of relative positions of the indicators 70 and 80 with respect to the screen SC. The motion detecting section 552 creates locus data for indicating motions of the indication positions of the respective indicators 70 and 80 based on the coordinates of the indication positions of the indicators 70 and 80 stored in the memory. The motion detecting section 552 outputs the created locus data of the indication positions of the indicators 70 and 80 to the control section 30.

The control section 30 stores the locus data of the indication positions of the indicators 70 and 80 input from the motion detecting section 552 in association with the user's position information in the storage section 60. Further, the control section 30 detects indication operations using the indicators 70 and 80 based on the locus data of the indication positions of the indicators 70 and 80.

The indicator 70 includes a control section 73, the transmitting/receiving section 74, the operation switch 75, and a power source section 76, and accommodates the respective sections in the shaft section 72 (FIG. 1). The control section 73 is connected to the transmitting/receiving section 74 and the operation switch 75, and detects a turning-on/turning-off state of the operation switch 75. The transmitting/receiving section 74 includes a light source such as an infrared LED, and a light receiving element that receives infrared light. Further, the transmitting/receiving section 74 turns on or turns off the light source under the control of the control section 73, and then outputs a signal indicating a light reception state of the light receiving element to the control section 73.

The power source section 76 includes a dry battery or a secondary battery as a power source, and supplies power to the respective sections of the control section 73, the transmitting/receiving section 74, and the operation switch 75. The indicator 70 may include a power source switch that turns on or turns off power supply from the power source section 76.

Here, a method of specifying an indication position of the indicator 70 from data on an image captured by the imaging section 51 by mutual communication of the position detecting section 50 and the indicator 70 will be described.

When an operation using the indicator 70 is detected, the control section 30 controls the imaging control section to transmit a synchronization signal through the transmitting section 53. That is, the imaging control section 52 turns on the light source of the transmitting section 53 at a predetermined cycle under the control of the control section 30. Infrared light that is periodically emitted from the transmitting section 53 functions as the synchronization signal for synchronizing the position detecting section 50 with the indicator 70.

On the other hand, after the power supply from the power source section 76 is started and a predetermined initialization operation is performed, the control section 73 receives the infrared light emitted from the transmitting section 53 of the projector 100 using the transmitting/receiving section 74. If the infrared light that is periodically emitted from the transmitting section 53 is received by the transmitting/receiving section 74, the control section 73 turns on (for light emission) the light source of the transmitting/receiving section 74 with a predetermined lighting pattern specific to the indicator 70 in synchronization with a timing of the infrared light. Further, the control section 73 switches the lighting pattern of the transmitting/receiving section 74 according to an operation state of the operation switch 75. Thus, the object detecting section 551 of the projector 100 may determine the operation state of the indicator 70, that is, whether the tip portion 71 is pressed against the screen SC based on data on plural captured images.

Further, the control section 73 repeatedly executes the pattern while power is being supplied from the power source section 76. That is, the transmitting section 53 periodically transmits an infrared signal for synchronization to the indicator 70, and the indicator 70 transmits a preset infrared signal in synchronization with the infrared signal transmitted by the transmitting section 53.

The imaging control section 52 of the position detecting section 50 performs a control for matching an imaging timing in the imaging section 51 with a timing when the indicator 70 is turned on. The imaging timing is determined based on a timing when the imaging control section 52 turns on the transmitting section 53. The object detecting section 551 may specify a turning-on pattern of the indicator 70 according to whether an image of light of the indicator 70 is included in data on an image captured by the imaging section 51. The object detecting section 551 determines whether the tip portion 71 of the indicator 70 is pressed against the screen SC based on data on plural captured images, to thereby generate touch information.

The lighting pattern of the indicator 70 may include a pattern specific to each indicator 70, or may include a pattern common to plural indicators 70 and a specific pattern for each indicator. In this case, when images of infrared light emitted from the plural indicators 70 are included in the captured image data, the imaging control section 52 may distinguish the respective images as images of the different indicators 70.

The control section 30 reads and executes the control program 61 stored in the storage section 60 to realize functions of a projection control section 31, a determining section 32 and a detection control section 33, and controls the respective sections of the projector 100.

The projection control section 31 acquires operation content obtained by operating the remote controller by the user based on operation data input from the operation detecting section 17. The projection control section 31 controls the image processing section 40, the light source driving section 45, and the light modulator driving section 46 according to the operation performed by the user, and projects an image onto the screen SC.

Further, the projection control section 31 controls the image processing section 40 to execute the discrimination process of the 3D (stereoscopic) image and the 2D (plane) image, the resolution conversion process, the frame rate conversion process, the distortion correction process, the digital zoom process, the color tone correction process, the luminance correction process, or the like. Further, the projection control section 31 controls the light source driving section 45 according to a process of the image processing section 40, and controls the intensity of light of the light source section 21.

The determining section 32 receives, as inputs, coordinates of an indication position of the indicator 80 and distance information thereof, and coordinates of an indication position of the indicator 70 and distance information thereof from the object detecting section 551.

The determining section 32 compares the input distance between the indicator 70 and the screen SC with the distance between the indicator 80 and the screen SC to determine whether or not to detect an indication position or a motion of the indicator 70 as an indication operation. When the distance between the indicator 70 and the screen SC is longer than the distance between the indicator 80 and the screen SC, the determining section 32 excludes the indicator 70 from a detection target of the indication operation. That is, the determining section 32 selects an indicator closer to the screen SC among the indicators 70 and 80 as a detection candidate of the indication operation with respect to the screen SC.

Further, in the case of the indicator 80 which is selected as the detection candidate of the indication operation, when the distance between the indicator 80 and the screen SC is within a predetermined distance, the determining section 32 selects the indicator 80 as an indicator of which an indication operation is to be detected. Further, even in the case of an indicator which is detected by the object detecting section 551, an indication operation of an indicator for which a distance between the indicator and the screen SC is not within the predetermined distance is not detected.

The determining section 32 may determine whether the indicator 70 or 80 is in contact with the screen SC and may select an indicator of which an indication operation with respect to the screen SC is to be detected. For example, when it is determined that the indicator 80 is in contact with the screen SC and the indictor 70 is not in contact with the screen SC, the determining section 32 may determine that the indicator 80 is at a position closer to the screen SC compared with the indicator 70. Further, since the indicator 80 is in contact with the screen SC, the determining section 32 may determine that the distance between the indicator 80 and the screen SC is within the predetermined distance.

The determining section 32 causes the motion detecting section 552 to detect a motion of the selected indicator 80. The determining section 32 receives, as an input, locus data for indicating the motion of the selected indicator 80 with respect to the screen SC from the motion detecting section 552, and detects an indication operation of the indicator 80 based on the input locus data. The indication operation includes an operation indicating the position of the indicator 80 with respect to the screen SC, or a motion of the indicator 80 with respect to the screen SC, as described above.

The determining section 32 detects the motion of the indicator 80 with respect to the screen SC and the position of the indicator 70 with respect to the screen SC to determine whether or not to set the indicator 70 as a detection target of an indication operation. When it is determined by the determining section 32 that the distance between the indicator 70 and the screen SC is longer than the distance between the indicator 80 and the screen SC, a condition of "the position of the indicator 70 with respect to the screen SC" is satisfied.

Figure 3:
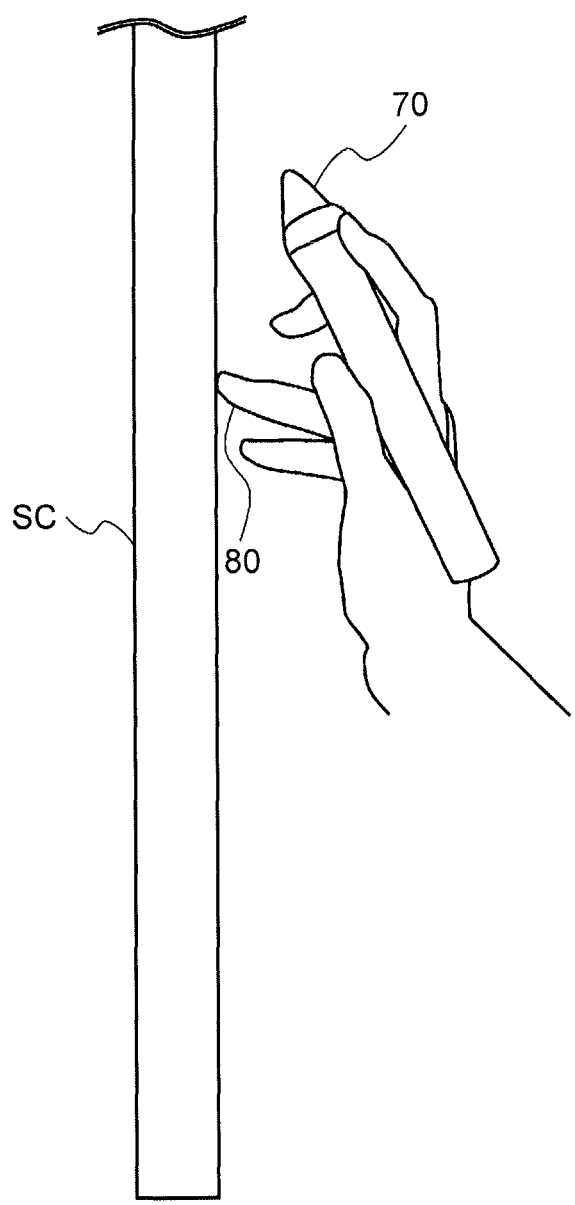
FIG. 3 is a diagram illustrating an indication operation detected by a projector.

Further, when it is determined by the determining section 32 that the indicator 80 does not move from a predetermined position (indication position) of the screen SC for a predetermined time based on the locus data of the indicator 80, a condition of "the motion of the indicator 80 with respect to the screen SC" is satisfied. For example, as shown in FIG. 3, when a user touches the screen SC with a finger of the hand that holds the indicator 70, the finger which is the indicator 80 is closer to the screen SC compared with the indicator 70. In this case, if the indicator 80 does not move from a predetermined position of the screen SC for a predetermined time or longer, the determining section 32 determines a motion of the indicator 80 based on locus data as an indication operation at a position with respect to the screen SC. In this case, the determining section 32 adds identification data for indicating an indication based on the indicator 80 and a delete command for deleting a drawn figure or arranged characters or signs to coordinates of the indication position indicated by the indicator 80, and outputs the result to the detection control section 33.

Further, when plural indicators 80 are detected from the same person region, the determining section 32 causes the motion detecting section 552 to detect motions of the plural indicators 80.

Figure 4:
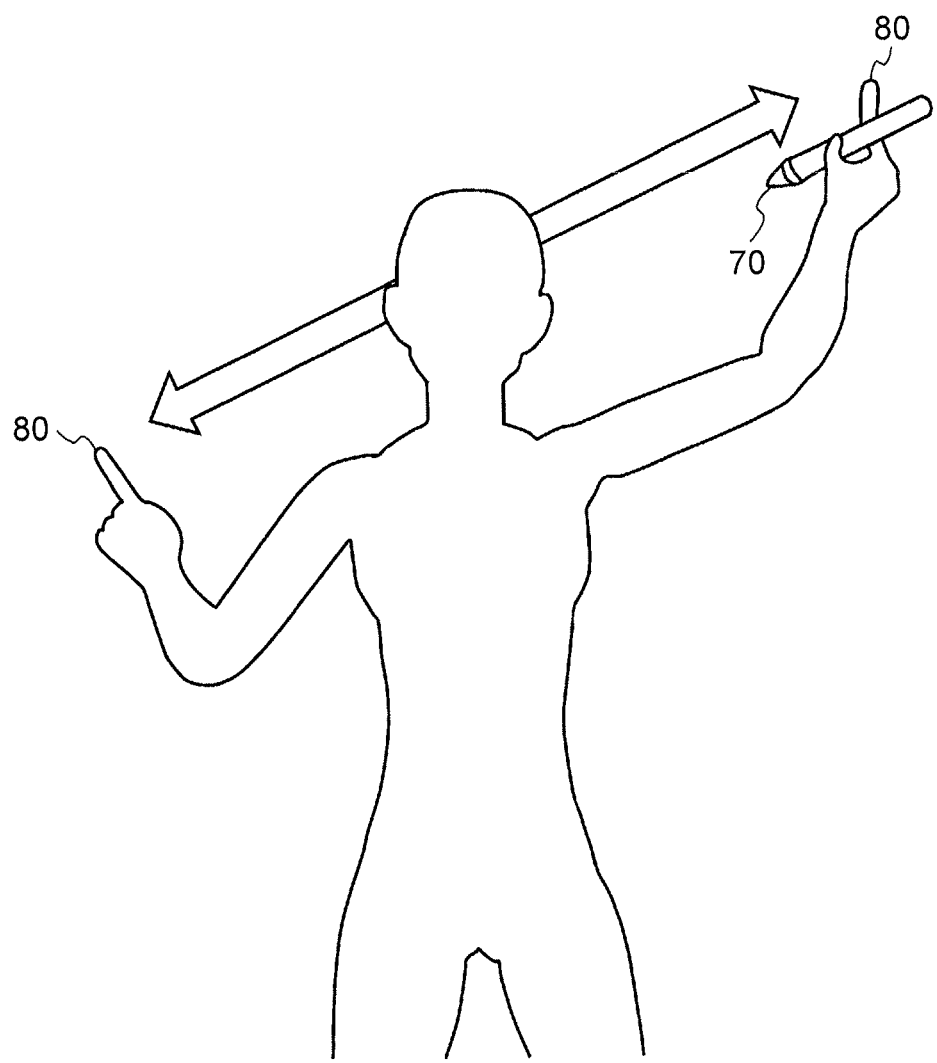
FIG. 4 is a diagram illustrating an indication operation detected by a projector.

The determining section 32 determines a change of a distance between the indicators 80 based on locus data of each of the plural indicators 80, which is detected by the motion detecting section 552. For example, as shown in FIG. 4, when the distance between the indicators 80 becomes long over time, the determining section 32 determines that motions of the indicators 80 are indication operations with respect to the screen SC. In this case, the determining section 32 determines that the motions of the indicators 80 are indication operations of enlarging an image displayed on the screen SC. In this case, the determining section 32 outputs an instruction command for enlarging the displayed image, an enlargement ratio of the displayed image acquired from locus data of each of the indicators 80, and identification data for indicating an indication based on the indicator 80 to the detection control section 33.

Further, contrary to the example shown in FIG. 4, when the distance between the indicators 80 becomes short over time, the determining section 32 similarly determines that the motions of the plural indicators 80 are indication operations with respect to the screen SC. In this case, the determining section 32 determines that the motions of the indicators 80 are indication operations of reducing an image displayed on the screen SC. In this case, the determining section 32 outputs an instruction command for reducing the displayed image, a reduction ratio of the displayed image acquired from locus data of each of the indicators 80, and identification data for indicating an indication based on the indicator 80 to the detection control section 33.

Further, when it is detected that plural fingers of plural users are detected as the indicators 80 by the object detecting section 551, the determining section 32 associates the detected indicators 80 with the users. That is, since there is a case where the plural indicators 80 are detected from a single user, the determining section 32 selects a single indicator 80 of which an indication operation is to be detected for each user based on distances between the screen SC and the respective indicators 80. Further, the determining section 32 determines whether the detected motion of each indicator 80 corresponds to the indication operation for each user. The determining section 32 detects the indication operation based on locus data of each indicator 80 input from the motion detecting section 552.

The detection control section 33 controls the position detecting section 50 to execute detection of the indicators 70 and 80.

Further, the detection control section 33 acquires data depending on an indication operation of the indicator 70 or 80 detected by the determining section 32, from the determining section 32. For example, when the indication operation detected by the determining section 32 is an indication for deleting a character drawn on the screen SC, the detection control section 33 receives, as inputs, coordinates of an indication position of the indicator 80, identification data for indicating an indication based on the indicator 80, and a delete command from the determining section 32. The detection control section 33 notifies the image processing section 40 of the indication for deleting the drawn character according to the data acquired from the determining section 32. The image processing section 40 deletes a character overlapped with a corresponding indication position in image data developed in the frame memory 41 according to an instruction of the detection control section 33.

Further, when the indication operation detected by the determining section 32 is an indication for enlarging a displayed image, the detection control section 33 receives, as inputs, an instruction command for enlarging the displayed image, an enlargement ratio of the displayed image, and identification data for indicating an indication based on the indicator 80 from the determining section 32.

The detection control section 33 instructs the image processing section 40 to enlarge the displayed image according to an instruction of the determining section 32. The image processing section 40 enlarges image data developed in the frame memory 41 with an enlargement ratio according to an instruction from the detection control section 33, and outputs an image signal based on the processed image data to the light modulator driving section 46.

Further, the detection control section 33 receives, as inputs, a command depending on an indication operation of the indicator 70 or 80, coordinates of an indication position or locus data of an indication position, and identification data for indicating an indication based on the indicator 70 or an indication based on the indicator 80 from the determining section 32. In addition, in the case of the indication based on the indicator 70, the detection control section 33 receives, as an input, touch information or distance information from the determining section 32, and in the case of the indication based on the indicator 80, the detection control section 33 receives, as an input, distance information from the determining section 32.

When a command for drawing a figure is input from the determining section 32, for example, the detection control section 33 causes the image processing section 40 to draw a figure based on coordinates of an indication position or a locus of the indication position acquired from the determining section 32. Further, the detection control section 33 performs a process of projecting the drawn figure onto an input image that is input through the image I/F section 12 in an overlapping manner, by the image processing section 40.

Further, the detection control section 33 may output the acquired coordinates of the indication position or the acquired locus data of the indication position to an external device such as a PC connected to the I/F section 11 according to a command input from the determining section 32. In this case, the detection control section 33 may convert the acquired coordinates of the indication position or the acquired locus of the indication position into a data format that is recognizable as an input of a coordinate input device in an operating system of the external device connected to the I/F section 11. For example, when a PC that is operated in a Windows (registered trademark) operating system is connected to the I/F section 11, the detection control section 33 outputs data to be processed as input data of a human interface device (HID) in the operating system. Further, the detection control section 33 may output, together with the coordinates of the indication position or the locus data of the indication position, data for identifying whether the coordinates or the locus data is based on an operation of the indicator 70 or an operation of the indicator 80, and touch information or distance information to the external device.

Figure 5:
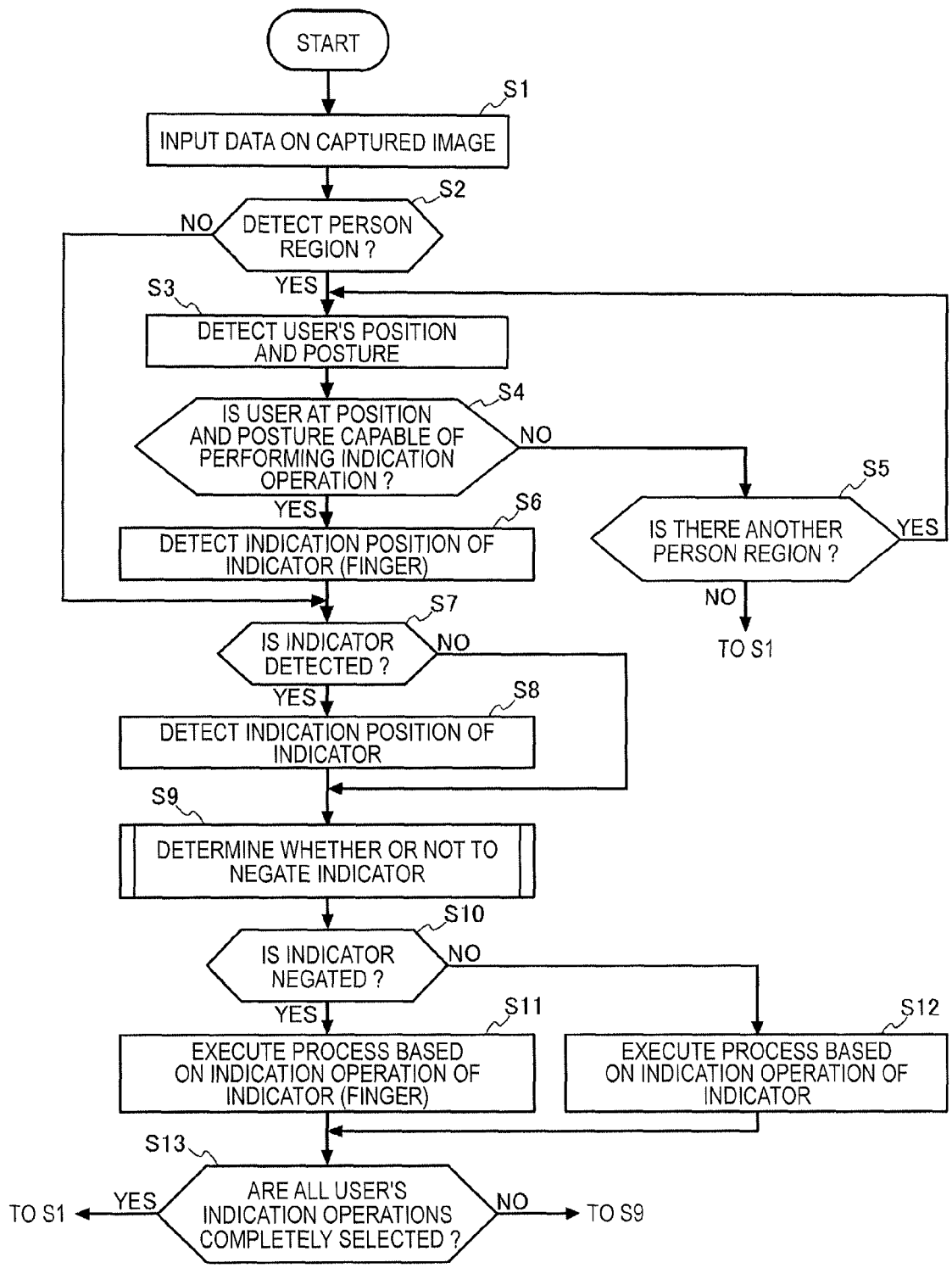
FIG. 5 is a flowchart illustrating an operation procedure of a projector.
Figure 6:
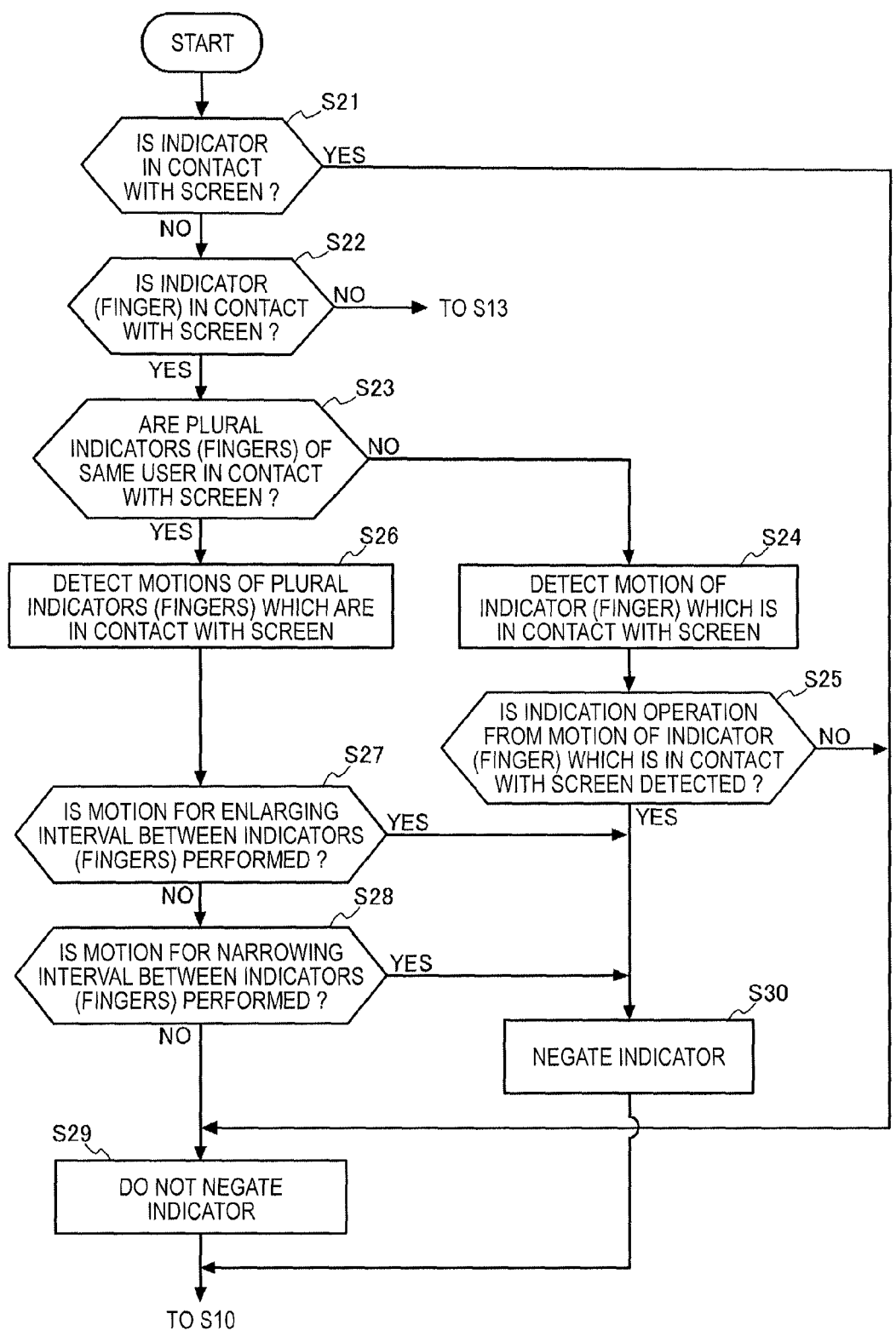
FIG. 6 is a flowchart illustrating details of step S9.

FIGS. 5 and 6 are flowcharts illustrating processing procedures of the projector 100.

First, the detecting section 55 of the position detecting section 50 receives, as an input, data on an image captured by the imaging section 51 from the imaging control section 52 (step S1). The detection control section 33 of the control section 30 controls the imaging control section 52 to cause the imaging section 51 to capture an imaging range. The imaging section 51 alternately executes imaging based on infrared light and imaging based on visible light. The imaging control section 52 outputs data on the image captured by the imaging section 51 to the position detecting section 50.

The object detecting section 551 of the position detecting section 50 detects a person region where a person is included from the input captured image data (step S2). When the person region cannot be detected from the captured image data (step S2/NO), the object detecting section 551 proceeds to a process of step S7 (step S7). Further, when the person region is detected from the captured image data (step S2/YES), the object detecting section 551 detects a user's position and posture for each detected person region (step S3). The object detecting section 551 calculates a value of central coordinates of the person region as position information indicating the user's position in a horizontal direction of the captured image data, for example. Further, when plural person regions are detected from the captured image data, the object detecting section 551 detects plural pieces of position information indicating users' positions according to the person regions. Further, the object detecting section 551 recognizes a portion of the human body such as a head, shoulder, hand or foot of the user based on the detected person region to detect the user's posture (step S3).

The object detecting section 551 determines whether the user is in a position or posture capable of performing an operation with respect to the screen SC based on the detected user's position and posture (step S4). For example, when a distance between the user and the screen SC is long or when the arms of the user are folded, the object detecting section 551 determines that the user is not in the posture capable of performing an indication operation with respect to the screen SC.

When the determination result in step S4 is negative (step S4/NO), the object detecting section 551 stops the process relating to the person region of the user, and determines whether another person region is detected in step S2 (step S5). When the determination result is affirmative (step S5/YES), the object detecting section 551 performs the processes of step S3 and S4 for another person region. Further, when the determination result is negative (step S5/NO), the procedure returns to step S1, and the detecting section 55 receives, as an input, the data on the image captured by the imaging section 51 from the imaging control section 52 (step S1).

When the determination result in step S4 is affirmative (step S4/YES), the object detecting section 551 detects a finger image of the user from the person region of the captured image data to detect the indicator 80. The object detecting section 551 detects a region close to a predetermined finger's shape or characteristic from the person region as a region of the indicator 80. Further, the object detecting section 551 calculates coordinates of an indication position of the screen SC indicated by the indicator 80 from the detected region of the indicator 80 (step S6). The object detecting section 551 specifies a tip (finger tip) of the finger from the detected region of the indicator 80 to detect the position of the specified fingertip as the coordinates of the indication position. Further, the object detecting section 551 converts the detected coordinates of the indication position of the indicator 80 into coordinates of an indication position in an image displayed on the screen SC. Further, the object detecting section 551 detects a distance between the indicator 80 and the screen SC. The object detecting section 551 outputs the converted coordinates of the indication position of the indicator 80 and information about the distance between the indicator 80 and the screen SC together with the user position information to the control section 30. If the coordinates of the indication position of the indicator 80, the distance information, and the user position information are input from the object detecting section 551, the control section 30 stores the input coordinates of the indication position of the indicator 80 and the distance information in association with the user position information in the storage section 60.

Next, the object detecting section 551 determines whether or not infrared light emitted from the indicator 70 is included in data on an image captured based on the infrared light to detect the indicator 70 (step S7). When the infrared light emitted from the indicator 70 is detected in the captured image data, the object detecting section 551 detects the position of the detected infrared light in the captured image data as coordinates of an indication position of the indicator (step S8). Further, the object detecting section 551 determines whether the tip portion 71 of the indicator 70 is pressed against the screen SC. The control section 73 of the indicator 70 switches a lighting pattern of the transmitting/receiving section 74 according to an operation state of the operation switch 75. The object detecting section 551 determines the lighting pattern of the transmitting/receiving section 74 based on data on plural images captured by the imaging section 51 to determine whether or not the tip portion 71 of the indicator 70 is pressed against the screen SC. Further, the object detecting section 551 calculates a distance between the indicator 70 and the screen SC based on data on an image captured based on visible light of the imaging section 51. For example, the object detecting section 551 detects an image of the indicator 70 and a shadow image of the indicator 70 from the captured image data, and calculates the distance between the tip of the indicator 70 and the screen SC based on a distance between the detected images.

The object detecting section 551 outputs the coordinates of the indication position of the indicator 70, the touch information, and the distance information together with the user position information to the control section 30. The control section 30 stores the coordinates of the indication position of the indicator 70, the touch information, and the distance information input from the object detecting section 551 in association with the user position information in the storage section 60.

Then, the determining section 32 causes the motion detecting section 552 to generate locus data indicating a motion of the indicator 80 to determine whether or not to negate the indicator 70 based on the locus data of the indicator 80 and the coordinates of the indication position of the indicator 70 acquired from the motion detecting section 552 (step S9). Details of the process of step S9 are shown in FIG. 6. When it is determined that the indicator 70 is to be negated (step S10/YES), the determining section 32 negates the data relating to the indicator 70, for example, the coordinates of the indication position of the indicator 70, and does not output the data to the detection control section 33. In this case, the determining section 32 outputs data depending on an indication operation detected from the locus data of the indicator 80 or the coordinates of the indication position of the indicator 80 to the detection control section 33. The detection control section 33 executes a preset process based on the acquired coordinates and data (step S11). For example, if coordinates of an indication position, identification data for indicating an indication based on the indicator 80, and a delete command are input from the determining section 32, the detection control section 33 notifies the image processing section 40 of an instruction for deleting a drawn figure or arranged characters or signs at an indicated position. The image processing section 40 deletes a figure, characters or signs overlapped at a corresponding position in image data developed in the frame memory 41 according to the instruction notified from the detection control section 33.

Further, when an instruction command for enlarging an image, an enlargement ratio of a displayed image obtained from locus data of each indicator 80, and identification data for indicating an indication based on the indicator 80 are input from the determining section 32, the detection control section 33 instructs the image processing section 40 to enlarge the displayed image. The image processing section 40 enlarges image data developed in the frame memory 41 with an enlargement ratio according to an instruction from the detection control section 33, and outputs an image signal based on the processed image data to the light modulator driving section 46.

Further, if it is determined in step S10 that the indicator 70 is not to be negated (step S10/NO), the determining section 32 instructs the motion detecting section 552 to detect a motion of the indicator 70. The determining section 32 detects an indication operation of the indicator 70 based on locus data indicating the motion of the indicator 70 input through the motion detecting section 552. Further, the determining section 32 outputs data depending on the detected indication operation to the detection control section 33. The detection control section 33 executes a predetermined process according to the data acquired from the determining section 32 (step S12). For example, the detection control section 33 executes a process of causing the image processing section 40 to draw a figure based on the coordinates of the indication position or the locus of the indication position acquired from the determining section 32 and to project the drawn figure in an overlapping manner onto an image which is input through the image I/F section 12.

Then, the determining section 32 determines whether or not indication operations of all users are detected (step S13). The coordinates of the indication position of the indicator 80 detected in step S6 or the coordinates of the indication position of the indicator 70 detected in step S8 are stored in the storage section 60 in association with the user position information. The determining section 32 determines whether or not the processes of step S9 to S12 are completely executed with respect to all users of which the position information is stored in the storage section 60. When the determination result is negative (step S13/NO), the determining section 32 executes the processes from step S9. Further, when the determination result is affirmative (step S13/YES), the procedure returns to step S1, and then, the detecting section 55 receives, as an input, captured image data from the imaging control section 52.

FIG. 6 is a flowchart illustrating details of step S9 in FIG. 5.

First, when the indicator 70 is detected, the determining section 32 determines whether or not the detected indicator 70 is in contact with the screen SC (step S21). The determining section 32 determines whether or not the indicator 70 is in contact with the screen SC based on touch information. When the determination result is affirmative (step S21/YES), the determining section 32 determines that the indicator 70 is not to be negated (step S29), and terminates the processing flow. Then, the determining section 32 causes the motion detecting section 552 to detect a motion of the indicator 70, and detects an indication operation of the indicator 70 based on locus data of the indicator 70 input from the motion detecting section 552.

When the determination result in step S21 is negative (step S21/NO), and when the indicator 80 is detected, the determining section 32 determines whether or not the detected indicator 80 is in contact with the screen SC (step S22). The determining section 32 determines whether or not the indicator 80 is in contact with the screen SC based on information about a distance between the indicator 80 detected by the object detecting section 551 and the screen SC. When the determination result is negative (step S22/NO), since the indicators 70 and 80 are not in contact with the screen SC, the procedure proceeds to step S13 shown in FIG. 5, and determines whether or not another indication operation of a user is detected (step S13).

Further, when the determination result is affirmative (step S22/YES), the determining section 32 determines that a distance between the indicator 80 and the screen SC is shorter than a distance between the indicator 70 and the screen SC. Further, since the indicator 80 is in contact with the screen SC, the determining section 32 determines that the distance between the indicator 80 and the screen SC is within a predetermined distance. Thus, the determining section 32 selects the indicator 80 as an indicator of which an indication operation is to be detected.

Then, the determining section 32 determines whether or not plural indicators 80 of the same user are in contact with the screen SC (step S23). The determining section 32 determines whether or not indication positions of the plural indicators 80 are associated with position information of the user. When the indication positions of the plural indicators 80 are associated with the position information of the same user, the determining section 32 determines whether or not other associated indicators 80 are in contact with the screen SC (step S23).

When the determination result in step S23 is negative (step S23/NO), the determining section 32 causes the motion detecting section 552 to detect a motion of the indicator 80 which is in contact with the screen SC (step S24). Then, the determining section 32 determines whether or not an indication operation of the indicator 80 is detected based on locus data of the indicator 80 input from the motion detecting section 552 (step S25). For example, as shown in FIG. 3, when a user touches the screen SC with a finger of the hand that holds the indicator 70, the finger of the hand which is the indicator 80 is closer to the screen SC compared with the indicator 70. In this case, if the indicator 80 does not move from a predetermined position on the screen SC for a predetermined time or longer, the determining section 32 determines the motion of the indicator 80 based on locus data as an indication operation at a position with respect to the screen SC. When the determination result in step S25 is affirmative (step S25/YES), the determining section 32 negates the indicator 70 (step S30). That is, the determining section 32 negates data relating to the indicator 70, for example, coordinates of an indication position of the indictor 70, and does not output the data to the detection control section 33. Further, for example, the determining section 32 adds identification data for indicating an indication based on the indicator 80 and a delete command to the coordinates of the indication position indicated by the indicator 80, and outputs the result to the detection control section 33.

The indicator 80 may be a hand opposite to the hand that holds the indicator 70. For example, when the indicator 70 is held by the right hand, a motion of the left hand which is the indicator 80 may be detected by the motion detecting section 552.

Further, when the determination result in step S25 is negative (step S25/NO), the determining section 32 causes the motion detecting section 552 to detect a motion of the indicator 70 without negating the indicator 70 (step S29). The determining section 32 detects an indication operation of the indicator 70 based on locus data of the indicator 70 input from the motion detecting section 552.

Further, when the determination result in step S23 is affirmative (step S23/YES), the determining section 32 causes the motion detecting section 552 to detect motions of the plural indicators 80 that are in contact with the screen SC (step S26). Then, the determining section 32 determines whether or not indication operations of the plural indicators 80 are detected based on locus data of the plural indicators 80 input from the motion detecting section 552 (step S27). Further, the determining section 32 determines whether or not a motion for enlarging an interval of fingers which are indicators 80 is detected based on locus data of the plural fingers (step S27). First, the determining section 32 determines whether or not a motion for enlarging an interval between the right hand and the left hand or a motion for enlarging an interval of fingers of the same hand is detected, for example. When the determination result is affirmative (step S27/YES), the determining section 32 determines that the indicator 70 is to be negated since the indication operation of the indicator 80 is detected (step S30). That is, the determining section 32 negates data relating to the indicator 70, for example, coordinates of an indication position of the indicator 70, and does not output the data to the detection control section 33.

Further, when the determination result is negative (step S27/NO), the determining section 32 determines whether or not a motion for narrowing an interval of fingers which are the indicators 80 is detected based on locus data of the plural fingers (step S28). The determining section 32 determines whether or not a motion for narrowing an interval between the right hand and the left hand or a motion for narrowing an interval of fingers of the same hand is detected, for example. When the determination result is affirmative (step S28/YES), the determining section 32 determines that the indicator 70 is to be negated since the indication operation of the indicator 80 is detected (step S30). Further, when the determination result is negative (step S28/NO), the determining section 32 determines that the indicator 70 is not to be negated (step S29), and terminates the processing flow. Then, the determining section 32 causes the motion detecting section 552 to detect a motion of the indicator 70. The determining section 32 detects an indication operation of the indicator 70 based on locus data of the indicator 70 input from the motion detecting section 552.

In the flowchart shown in FIG. 6, an example in which when the indicator 70 or 80 is in contact with the screen SC, the projector 100 causes the motion detecting section 552 to detect the motion of the indicator 80 with respect to the screen SC is described. In addition, even though the indicator 80 is not in contact with the screen SC, when a distance between the indicator 80 and the screen SC is short, the projector 100 may cause the motion detecting section 552 to detect the motion of the indicator 80, and may detect an indication operation from the detected motion of the indicator 80.

As described above, the projector 100 of the present embodiment includes the detecting section 55, the imaging section 51, and the control section 30. The detecting section 55 detects the indicator 70 that performs an operation with respect to the screen SC, and the indicator 80 which is different from the indicator 70. The imaging section 51 forms an image obtained by imaging a range including the screen SC. The control section 30 determines whether or not to detect an operation of the indicator 70 as an input by detecting a motion of the indicator 80 with respect to the screen SC and the position of the indicator 70 with respect to the screen SC based on the captured image data, by the determining section 32. Accordingly, it is possible to prevent an operation that is not intended by a user from being detected as an input operation.

Further, the detecting section 55 detects the position or motion of the indicator 70, and the control section 30 detects an input based on the position or motion of the indicator 80. Accordingly, according to the determination result of the control section 30, it is possible to cause the detecting section 55 to detect the position or motion of the indicator 70 or 80 as an operation.

Further, the control section 30 determines whether to detect the position or motion of the indicator 70 as an input based on the distance between the indicator 70 and the screen SC, and the distance between the indicator 80 and the screen SC. Accordingly, by changing the distances between the indicators 70 and 80 and the screen SC, it is possible to switch whether to detect the position or motion of the indicator 70 or the position or motion of the indicator 80.

Further, when the distance between the indicator 70 and the screen SC is longer than the distance between the indicator 80 and the screen SC, the control section 30 does not detect the position or motion of the indicator 70 as an input. Accordingly, when the distance between the indicator 70 and the screen SC is longer than the distance between the indicator 80 and the screen SC, the control section 30 may prevent the position or motion of the indicator 70 from being detected as an input.

Further, when the detecting section 55 detects plural indicators 80, the control section 30 detects a position or motion of an indicator 80 for which a distance between the indicator 80 and the screen SC is shorter than the distance between the indicator 70 and the screen SC as an input. Accordingly, it is possible to detect the positions or motions of the plural indicators 80 for which the distances between the indicators 80 and the screen SC are shorter than the distance between the indicator 70 and the screen SC.

Further, when plural indicators 80 for which distances between the indicators 80 and the screen SC are shorter than the distance between the indicator 70 and the screen SC are detected, the control section 30 calculates a distance change between the plural indicators 80 based on data on an image captured by the imaging section 51. The control section 30 detects a motion of the indicator 80 with respect to the screen SC as an input based on the calculated distance change. Accordingly, it is possible to detect the distance change between the plural indicators 80 as a motion of the indicator 80 with respect to the screen SC.

Further, the control section 30 calculates a temporal change of a relative position of each indicator 80 with respect to the screen SC based on data on an image captured by the imaging section 51 to detect a distance change between the plural indicators 80. Accordingly, it is possible to calculate a temporal change of a relative position of each indicator 80 with respect to the screen SC to detect the distance change between the plural indicators 80.

Further, when the indicator 80 detected by the detecting section 55 is a user's finger that holds the indicator 70, the control section 30 detects a position or motion of the indicator 80 as an input. Accordingly, it is possible to perform an operation by the user's finger while holding the indicator 70.

Further, when the detecting section 55 detects plural indicators 80, the control section 30 associates the detected plural indicators 80 with users, and causes the detecting section 55 to detect an operation of the indicator 80 for each user. Therefore, the operation by the indicators 80 can be detected for every users.

The above-described embodiments and modification examples are specific examples to which the invention is applied, and do not limit the invention. The invention may be applied to different configuration examples. For example, the indicators 70 and 80 are not limited to the pen type indicator 70 or the indicator 80 which is the user's finger, and may employ a laser pointer, a marker, or the like. Further, their shapes or sizes are not particularly limited.

Further, in the above-described embodiments, the position detecting section 50 images the screen SC by the imaging section 51 to specify the position of the indicator 70, but the invention is not limited thereto. For example, a configuration in which the imaging section 51 is provided in a main body of the projector 100 and performs imaging along a projection direction of the projection optical system 23 is not limitative. The imaging section 51 may be disposed separately from the main body of the projector 100 as a position detection device, or the imaging section 51 may perform imaging in a side direction of the screen SC or from a front surface of the screen SC. Further, plural imaging sections 51 may be disposed, and the detecting section 55 may detect the positions of the indicators 70 and 80 based on data on images captured by the plural imaging sections 51. Further, the functions of the position detecting section 50, and the determining section 32 and the detection control section 33 of the control section 30 may be realized as a position detection device which is independent of the projector. Further, a configuration in which a display device other than the projector has the functions of the position detecting section 50, and the determining section 32 and the detection control section 33 of the control section 30 to be operated as a position detection device may be realized.

In addition, in the above-described embodiments, a configuration in which a synchronization signal is transmitted to the indicator 70 from the projector 100 using an infrared signal emitted from the transmitting section 53 is described, but the synchronization signal is not limited to the infrared signal. For example, a configuration in which the synchronization signal is transmitted through radio wave communication or ultrasonic wireless communication may be used. This configuration may be realized by providing the transmitting section 53 that transmits a signal by radio wave communication or ultrasonic wireless communication in the projector 100, and by providing a receiving section corresponding thereto in the indicator 70.

Further, in the above-described embodiments, an example in which whether the tip portion 71 of the indicator 70 is pressed against the screen SC is determined based on a lighting pattern of the transmitting/receiving section 74 is described, but the invention is not limited thereto. For example, whether the tip portion 71 of the indicator 70 is pressed against the screen SC may be determined by detecting an image of the indicator 70 and a shadow image of the indicator 70 from the captured image data, similar to the indicator 80.

Furthermore, in the above-described embodiments, a configuration in which three transmissive liquid crystal panels corresponding to the respective colors of R, G, and B are used as the light modulator 22 that modulates light emitted by the light source is described as an example, but the invention is not limited thereto. For example, a configuration in which three reflection type liquid crystal panels are used, or a configuration in which one liquid crystal panel is combined with a color wheel may be used. Further, a configuration in which three digital mirror devices (DMD) are used, a DMD configuration in which one digital mirror device is combined with a color wheel, or the like may be used. When only one liquid crystal panel or one DMD is used as the light modulator, a member corresponding to a synthesis optical system such as a cross dichroic prism is not necessary. Further, any light modulator capable of modulating light emitted from a light source may be used without problems, instead of the liquid crystal panel and the DMD.

Further, the respective functional sections of the projector 100 shown in FIG. 2 show functional configurations, and specific embodiments thereof are not particularly limited. That is, it is not essential that hardware is mounted to individually correspond to each functional section, and a configuration in which plural functional sections are realized by causing one processor to execute a program may be used. Further, in the above-described embodiments, a part of the functions realized by software may be realized by hardware, or a part of the functions realized by hardware may be realized by software. Furthermore, specific configurations of other sections of the projector 100 may also be arbitrarily modified in a range without departing from the spirit of the invention.

What is claimed is:

1. A position detection device comprising:
a detecting section that detects an indicator separable from a user's hand and a target different from the indicator, the indicator performing a first operation with respect to an operation surface, the target performing a second operation with respect to the operation surface;
an imaging section that forms a captured image obtained by imaging a range including the operation surface; and
a control section that detects a motion of the target with respect to the operation surface and a position of the indicator with respect to the operation surface based on the captured image to determine whether to detect the first operation performed by the indicator as an input or to negate the indicator and to instead detect the second operation performed by the target as the input,
wherein the control section determines whether or not to detect the position of the indicator or the motion of the indicator as the input based on a distance between the indicator and the operation surface and a distance between the target and the operation surface, and
wherein the control section determines that the position or motion of the indicator is not to be detected as the input when the distance between the indicator and the operation surface is longer than the distance between the target and the operation surface.

2. The position detection device according to claim 1, wherein the detecting section detects the position of the indicator or a motion of the indicator, and the control section detects an input based on the position of the indicator or the motion of the indicator detected by the detecting section.

3. The position detection device according to claim 1, wherein when the detecting section detects the plural targets, the control section detects a position or motion of a target for which a distance between the target and the operation surface is shorter than the distance between the indicator and the operation surface as the input.

4. The position detection device according to claim 3, wherein when plural targets for which distances between the targets and the operation surface are shorter than the distance between the indicator and the operation surface are detected, the control section calculates a distance change between the plural targets based on the captured image from the imaging section, and detects the motion of the target with respect to the operation surface as the input based on the calculated distance change.

5. The position detection device according to claim 4, wherein the control section calculates a temporal change of a relative position of each target with respect to the operation surface based on the captured image from the imaging section to detect the distance change between the plural targets.

6. The position detection device according to claim 1, wherein when the target detected by the detecting section is an operator's finger that holds the indicator, the control section detects a position of the target or the motion of the target as the input.

7. The position detection device according to claim 6, wherein when the detecting section detects the plural targets, the control section associates each of the detected plural targets with the operator to detect an operation for each operator.

8. A projector comprising:
a projecting section that projects an image onto a projection surface;
a detecting section that detects an indicator separable from a user's hand and a target different from the indicator, the indicator performing a first operation with respect to an operation surface, the target performing a second operation with respect to the operation surface;
an imaging section that forms a captured image obtained by imaging a range including the projection surface; and
a control section that detects a motion of the target with respect to the projection surface and a position of the indicator with respect to the projection surface based on the captured image to determine whether to detect the first operation performed by the indicator as an input, or to negate the indicator and to instead detect the second operation performed by the target as the input,
wherein the control section determines whether or not to detect the position of the indicator or the motion of the indicator as the input based on a distance between the indicator and the operation surface and a distance between the target and the operation surface, and
wherein the control section determines that the position or motion of the indicator is not to be detected as the input when the distance between the indicator and the operation surface is longer than the distance between the target and the operation surface.

9. A position detection method comprising:
detecting an indicator separable from a user's hand and a target different from the indicator, the indicator performing a first operation with respect to an operation surface, the target performing a second operation with respect to the operation surface;
forming a captured image obtained by imaging a range including the operation surface;
detecting a motion of the target with respect to the operation surface and a position of the indicator with respect to the operation surface based on the image captured in the forming of the captured image to determine whether to detect the first operation performed by the indicator as an input, or to negate the indicator and to instead detect the second operation performed by the target as the input; and determining whether or not to detect the position of the indicator or the motion of the indicator as the input based on a distance between the indicator and the operation surface and a distance between the target and the operation surface, wherein it is determined that the position or motion of the indicator is not to be detected as the input when the distance between the indicator and the operation surface is longer than the distance between the target and the operation surface.

\* \* \* \* \*